United States Patent
Ceisel

(10) Patent No.: US 11,662,227 B2
(45) Date of Patent: May 30, 2023

(54) MAGNETIC ENCODING FOR SMART POSITION SENSOR RANGE EXTENSION

(71) Applicant: HONEYWELL INTERNATIONAL INC., Morris Plains, NJ (US)

(72) Inventor: Ahren Ceisel, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 84 days.

(21) Appl. No.: 16/956,844

(22) PCT Filed: Jan. 12, 2018

(86) PCT No.: PCT/US2018/013535
§ 371 (c)(1),
(2) Date: Jun. 22, 2020

(87) PCT Pub. No.: WO2019/139613
PCT Pub. Date: Jul. 18, 2019

(65) Prior Publication Data
US 2020/0318998 A1    Oct. 8, 2020

(51) Int. Cl.
*G01D 5/245* (2006.01)
*G01D 5/14* (2006.01)
(52) U.S. Cl.
CPC ........... *G01D 5/2455* (2013.01); *G01D 5/145* (2013.01)
(58) Field of Classification Search
CPC .................................................. G01D 5/2455
See application file for complete search history.

(56) References Cited

U.S. PATENT DOCUMENTS

| 6,545,463 B1 | 4/2003 | Dettmann et al. |
| 7,173,414 B2 | 2/2007 | Ricks et al. |

(Continued)

FOREIGN PATENT DOCUMENTS

| CN | 1197509 A | 10/1998 |
| CN | 101416020 A | 4/2009 |

(Continued)

OTHER PUBLICATIONS

Communication Pursuant to Rules 161(1) and 162 issued in European Application No. 18702847.7 dated Aug. 21, 2020, 3 pages.

(Continued)

*Primary Examiner* — Noam Reisner
(74) *Attorney, Agent, or Firm* — Alston & Bird LLP

(57) ABSTRACT

Apparatus and associated methods relate to cascaded sets of two or more individual permanent magnets distributed in a predetermined spatial relationship on a source carrier configured to translate proximate two or more magnetic field sensors distributed in a predetermined spatial relationship on a reference carrier. In an illustrative example, the permanent magnets may be arranged in at least two predetermined orientations. For example, each of the permanent magnets may direct its field in a predetermined orientation to produce a unique output code from a set of the magnetic field sensors. The output code may, for example, uniquely identify a relative position between the source carrier and the reference carrier. The magnetic field sensors may be, for example, anisotropic magneto-resistive elements. Cascaded sets of permanent magnets may cost-effectively increase the dynamic range of the relative position between the source carrier and the reference carrier by adding additional magnetic targets.

20 Claims, 12 Drawing Sheets

(56) References Cited

U.S. PATENT DOCUMENTS

| | | | |
|---|---|---|---|
| 8,659,290 B2 * | 2/2014 | Shimizu | G01D 5/145 324/244 |
| 9,360,345 B2 | 6/2016 | Fox | |
| 2008/0105059 A1 | 5/2008 | Turnbull et al. | |
| 2013/0200886 A1 * | 8/2013 | Kirste | G01D 5/34792 29/407.01 |
| 2015/0046117 A1 | 2/2015 | Schaaf | |

FOREIGN PATENT DOCUMENTS

| | | |
|---|---|---|
| CN | 102341675 A | 2/2012 |
| EP | 0979988 A1 | 2/2000 |

OTHER PUBLICATIONS

International Search Report of the International Searching Authority for PCT/US2018/013535 dated Oct. 16, 2018.

Written Opinion of the International Searching Authority for International Application No. PCT/US2018/013535, 7 pages.

Office Action received for European Application No. 18702847.7, dated Apr. 7, 2022, 7 pages.

Arcire et al., "Position Control of a bidirectional Moving Magnet Actuator Based on Contact less Hall-Effect Transducer," 9th International Symposium on Advanced Topics in Electrical Engineering, (2015).

CN Office Action dated Jun. 6, 2022 for CN Application No. 201880089573.

English Translation of CN Office Action dated Jun. 6, 2022 for CN Application No. 201880089573.

Communication about intention to grant a European patent dated Feb. 13, 2023 for EP Application No. 18702847.

ON Notice of Allowance dated Mar. 1, 2023 for CN Application No. 201880089573.

English translation of CN Notice of Allowance dated Mar. 1, 2023 for CN Application No. 201880089573.

\* cited by examiner

| Carrier Displacement | S1 | S2 | S3 |
|---|---|---|---|
| 0 | A | 0 | R |
| 1d | 0 | R | R |
| 2d | R | R | R |
| 3d | R | R | A |
| 4d | R | A | R |
| 5d | A | R | A |
| 6d | R | A | A |
| 7d | A | A | A |
| 8d | A | A | 0 |
| 9d | A | 0 | 0 |

FIG. 1C

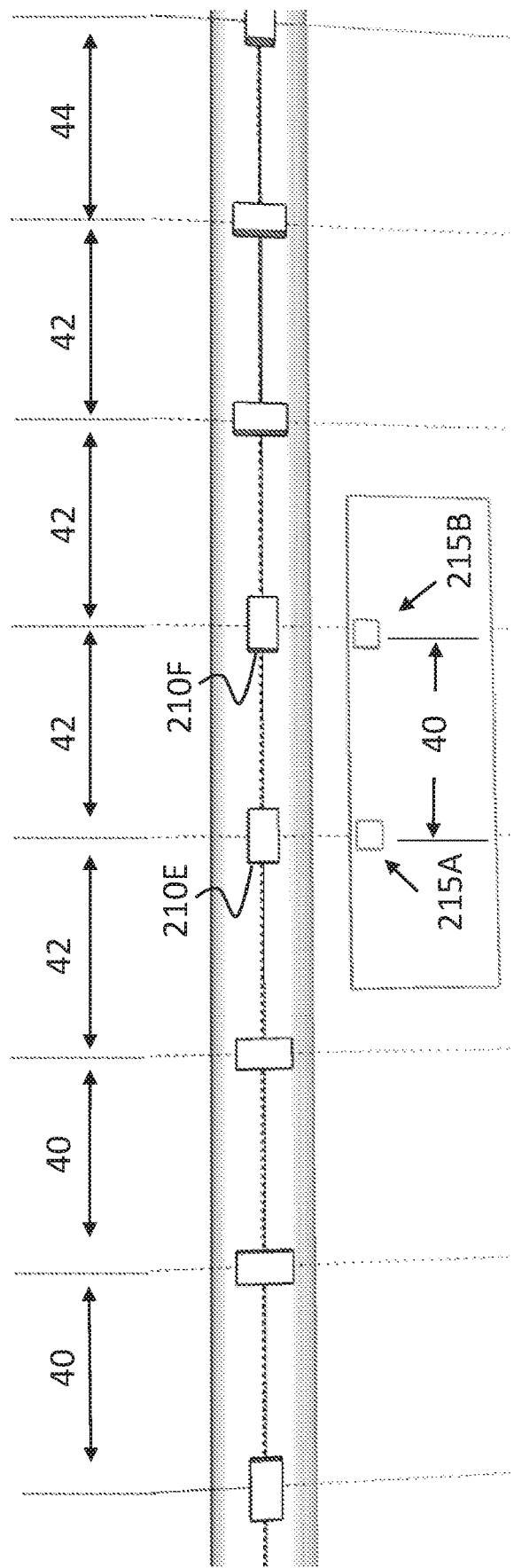

US 11,662,227 B2

MAGNETIC ENCODING FOR SMART POSITION SENSOR RANGE EXTENSION

TECHNICAL FIELD

Various embodiments relate generally to displacement sensors.

BACKGROUND

Automated computer equipment may read external inputs that represent various physical measurements. For example, temperature may be measured from a temperature sensor in an industrial computer controlled canning machine. The signal from the temperature sensor may be an analog voltage, and may be converted to a digital signal before it is read by a computer controller.

In an illustrative example, an industrial machine may read the position of a conveyor belt by monitoring the rotation of a wheel coupled to a conveyor belt. The wheel may produce a single pulse in response to the wheel rotating past a predetermined rotation angle. In some encoding schemes, the wheel may produce a high output for the first half rotation, and a low output for the second half rotation.

SUMMARY

Apparatus and associated methods relate to cascaded sets of two or more individual permanent magnets distributed in a predetermined spatial relationship on a source carrier configured to translate proximate two or more magnetic field sensors distributed in a predetermined spatial relationship on a reference carrier. In an illustrative example, the permanent magnets may be arranged in at least two predetermined orientations. For example, each of the permanent magnets may direct its field in a predetermined orientation to produce a unique output code from a set of the magnetic field sensors. The output code may, for example, uniquely identify a relative position between the source carrier and the reference carrier. The magnetic field sensors may be, for example, anisotropic magneto-resistive elements. Cascaded sets of permanent magnets may cost-effectively increase the dynamic range of the relative position between the source carrier and the reference carrier by adding additional magnetic targets.

Various embodiments may achieve one or more advantages. For example, various implementations may be employed underwater, within hazardous environments, and in environments with high vibrations. Some examples may determine various types of displacement, for example, linear displacement, angular displacement, helical displacement, or various arbitrary displacement paths. In various examples, position may still be determined even if one or more sensors and/or magnets fail.

The details of various embodiments are set forth in the accompanying drawings and the description below. Other features and advantages will be apparent from the description and drawings, and from the claims.

BRIEF DESCRIPTION OF THE DRAWINGS

FIG. 1C depicts a table view of a signal output of the exemplary extended range position sensor.

FIGS. 2A, 2B, 2C, 2D, 2E, and 2F depict perspective views of various relative peak positioning between a reference carrier and a source carrier of an exemplary extended range position sensor.

Like reference symbols in the various drawings indicate like elements.

DETAILED DESCRIPTION OF ILLUSTRATIVE EMBODIMENTS

Figure 1A:
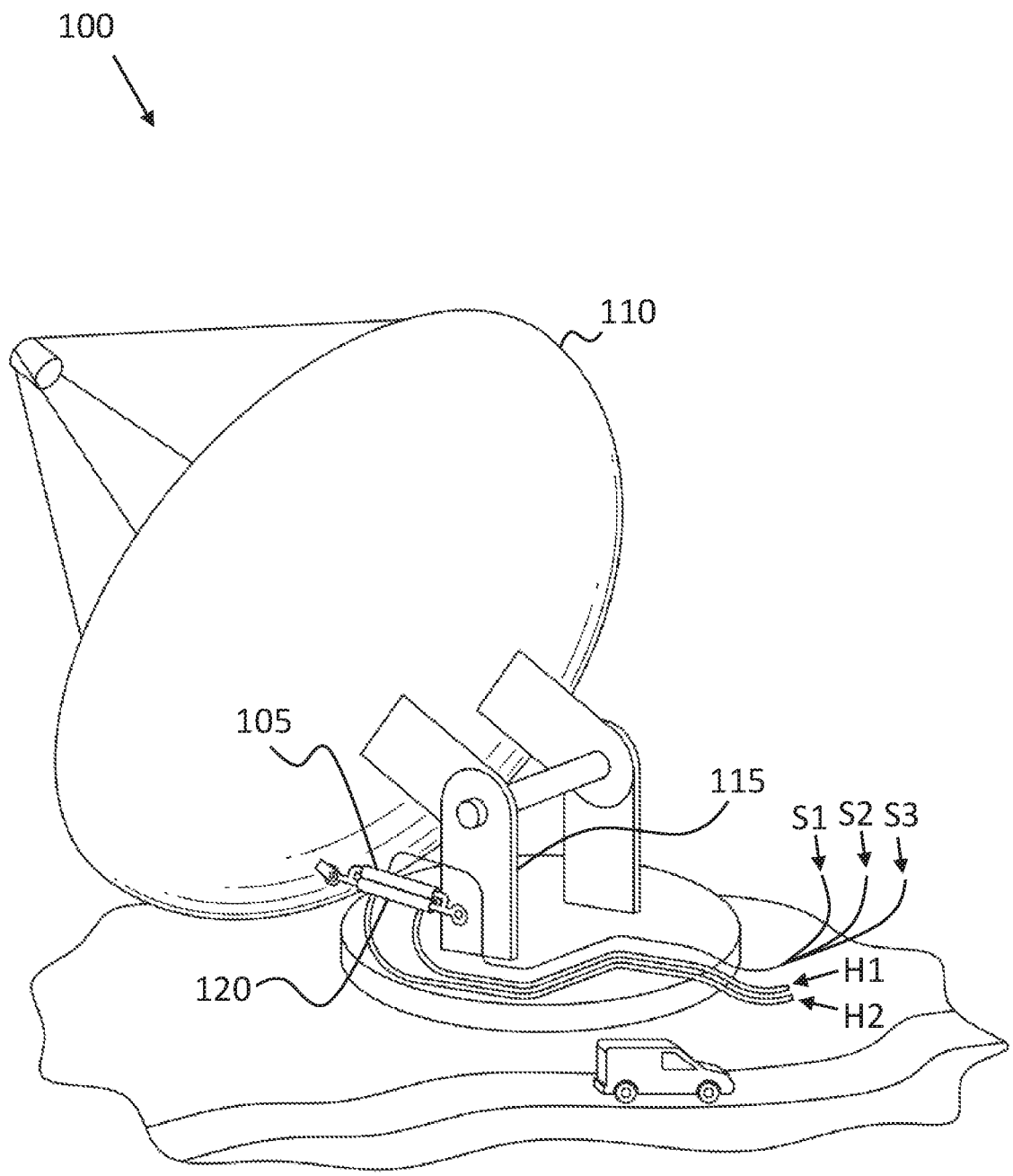
FIG. 1A depicts an exemplary extended range position sensor implemented on a large satellite dish to measure dish tilt displacement.

To aid understanding, this document is organized as follows. In FIG. 1A, an exemplary extended range position sensor in a use case scenario is briefly introduced. The use case scenario describes how the sensor outputs define a coarse encoded position. Next, in FIG. 1B more detail about the position sensor structure is described, for example, how the magnets and the sensors work together to encode the coarse position. In FIG. 1C, a table describing the coarse position codes is presented. The table presents the sensor output codes for all positions of the exemplary extended range position sensor described in FIGS. 1A and 1B. FIG. 1D presents the sensor outputs for a positional continuum of the exemplary extended range position sensor described in FIGS. 1A and 1B. The signals within the positional continuum may provide input to various algorithms. The algorithms may produce a higher-resolution positional result. FIGS. 2A-2F introduce the concept of spacing-distinguished magnetic sources. The spacing-distinguished magnetic sources may provide additional letters within the encoding alphabet to further extend the range of an exemplary position sensor. FIG. 3 discusses placement and operation of exemplary magnetic field sensors within an extended range position sensor. Finally, FIG. 4 introduces an angular embodiment of an exemplary extended range position sensor.

FIG. 1A depicts an exemplary extended range position sensor implemented on a large satellite dish to measure dish tilt displacement. An extended range position sensor application 100 includes an extended range position sensor 105. In the depicted example, the position sensor 105 is pivotably coupled at a distal end to a satellite dish 110. The position sensor 105 is pivotably coupled at a proximal end to a satellite dish mounting base 115. The position sensor 105 is coupled to a hydraulic piston 120. Further, the position sensor 105 is configured to determine the longitudinal displacement of the hydraulic piston 120.

The hydraulic piston 120 is actuated via a set of hydraulic lines H1 and H2. The hydraulic piston 120 adjusts the tilt of the satellite dish 110. The position sensor 105 measures the longitudinal displacement of the hydraulic piston 120. In the depicted example, a set of encoded measurement signals on signal wires S1, S2, and S3 may represent a coarse longitudinal displacement of the position sensor 105. For example, the set of measurement signals on signal wires S1, S2 and S3 may represent a three-letter word. Each letter position within the three-letter word may have, a finite number of output states (e.g., two possible output states), each output state representing a letter. The number of possible unique words may be represented by $b^n$, where b is the number of letters in the alphabet set (the number of possible output states), and n is the number of letters in the encoded word (the number of signals). In this example, the number of unique encoded words may result in $b^n=2^3$ or 6 possible unique words. Each word may represent a unique coarse longitudinal displacement of the position sensor 105.

Figure 1B:
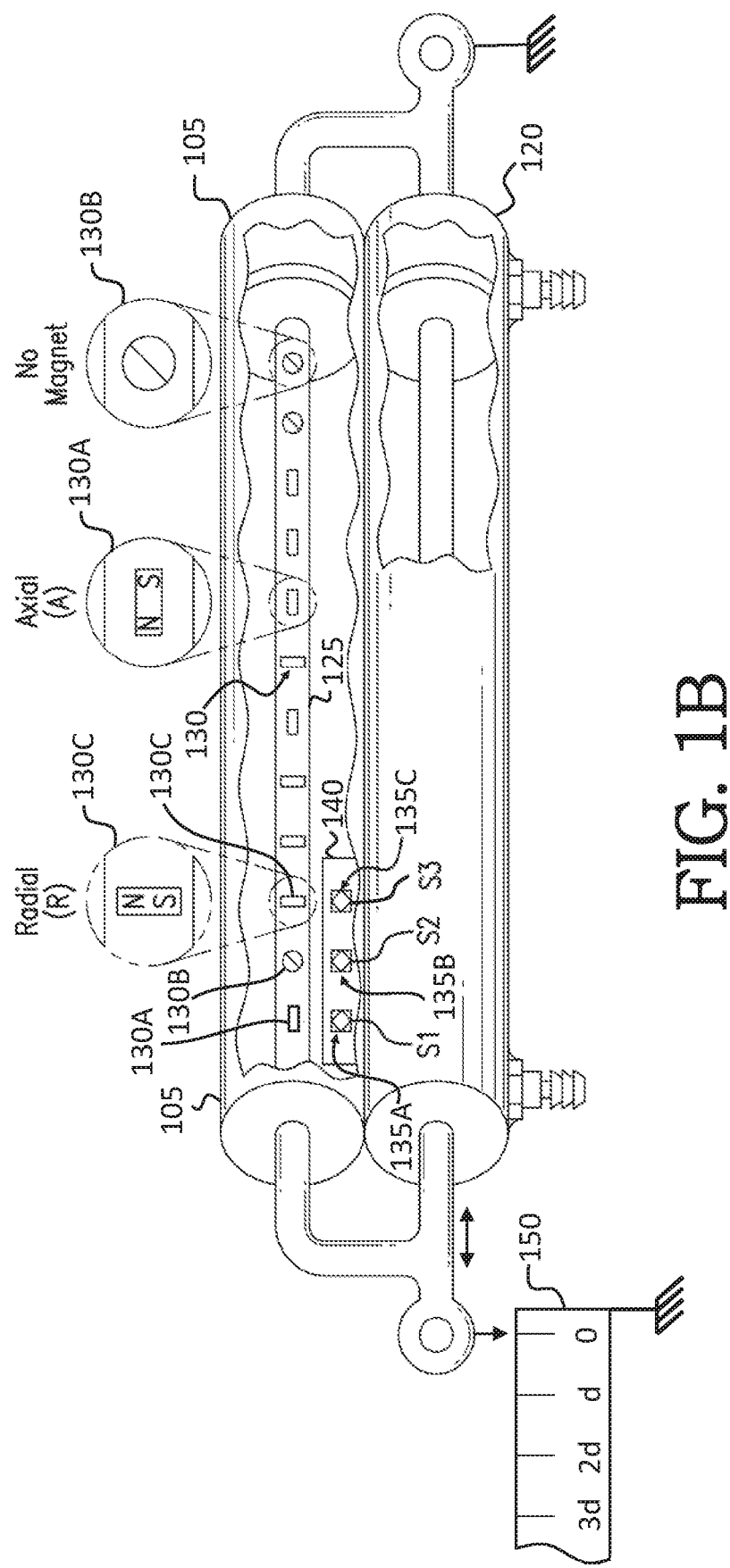
FIG. 1B depicts a perspective cut-away view of the exemplary extended range position sensor.
Figure 1D:
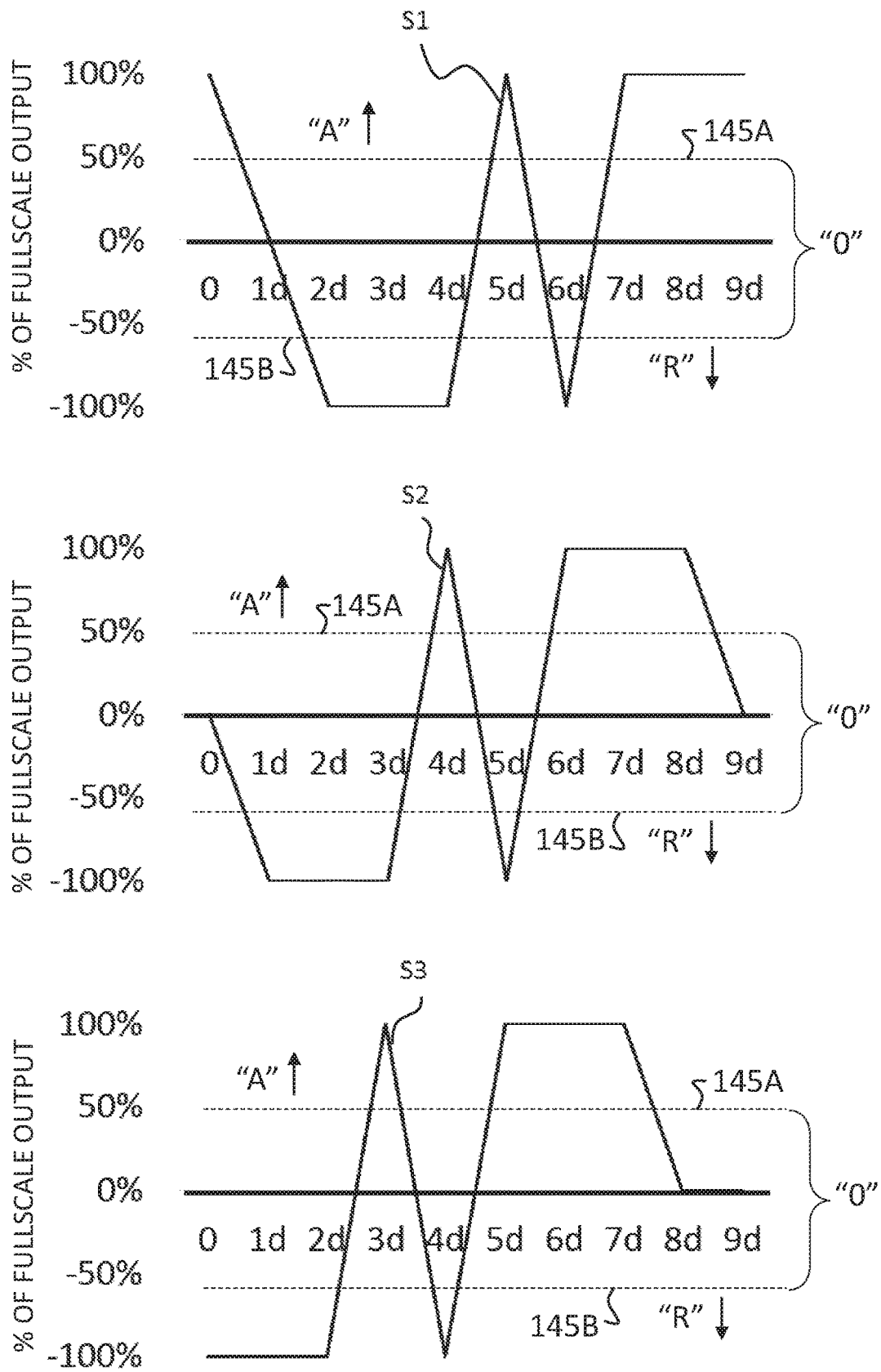
FIG. 1D depicts a chart view of a continuous analog output of the exemplary extended range position sensor.

FIG. 1B depicts a perspective cut-away view of the exemplary extended range position sensor. The extended range position sensor 105 includes a source carrier 125. The source carrier 125 includes a cascaded set of individual fixedly coupled permanent magnets 130. The permanent magnets 130 are distributed in a predetermined spatial relationship on the source carrier 125. Further, the permanent magnets 130 may be distributed on the source carrier 125 according to a pattern that encodes a coarse position.

In the depicted example, the permanent magnets 130 are arranged in two predetermined orientations. For example, a single magnet 130 may be placed in a radial orientation (N-S axis pointing perpendicular to the longitudinal axis of the source carrier 125) or axial orientation (N-S axis pointing parallel to the longitudinal axis of the source carrier 125).

The source carrier 125 is configured to translate proximate a set of magnetic field sensors 135A, 135B and 135C. The magnetic field sensors 135A, 135B and 135C may be, for example, Anisotropic Magneto-Resistive (AMR) elements and may be included in an AMR array. The magnetic field sensors 135A, 135B and 135C are distributed in a predetermined spatial relationship on a reference carrier 140. Accordingly, each of the permanent magnets 130 directs its field in a predetermined orientation to produce a unique output code from the set of magnetic field sensors 135A, 135B and 135C according to the longitudinal displacement of the source carrier 125. Each of the magnetic field sensors 135A, 135B and 135C may output a signal on a signal wire S1, S2 and S3.

In an illustrative example, the magnetic field sensor 135A may output a positive signal on a signal wire S1, in response to a proximately-located axially-oriented permanent magnet 130A. The magnetic field sensor 135B may output a null signal on a signal wire S2, in response to a proximately-located absent permanent magnet 130B. The magnetic field sensor 135C may output a negative signal on a signal wire S3, in response to a proximately-located radially-oriented permanent magnet 130C. The polarities (e.g., positive signal, negative signal) may facilitate identification of the orientation of the permanent magnets 130. In this example, the two polarities provide a two-letter alphabet set for encoding positional "words."

The signals present on the signal wires S1, S2 and S3 may represent a code. The code may uniquely identify a relative position between the source carrier 125 and the reference carrier 140. The distance between the permanent magnets 130 may represent the longitudinal displacement resolution of the position sensor 105. In the depicted example, the longitudinal displacement of the position sensor 105 may indicate the longitudinal displacement of the hydraulic piston 120.

FIG. 1C depicts a table view of a signal output of the exemplary extended range position sensor. The table presents the sensor outputs for all positions of the exemplary extended range position sensor 105 described in FIGS. 1A and 1B. In the depicted example, the associated magnetic field sensor outputs on signal wires S1, S2 and S3 are shown for each integral number of an arbitrary distance d, where d represents the distance between each of the magnetic field sensors (FIG. 1B, items 135A, 135B and 135C). The predetermined spacings of the magnetic field sensors (FIG. 1B, items 135A, 135B and 135C) match the predetermined spacings of the permanent magnets (FIG. 1B, item 130), in the depicted example. For purposes of illustration, the distance d may represent an arbitrary constant (e.g., 10.3 inches, 0.2 centimeters). By way of example and not limitation, the practical minimum distance d may be a function of magnetic strength, magnetic geometry, ability for the sensors to discriminate among magnetic fields from adjacent magnetic field sources, and the desired accuracy of the measured displacement.

FIG. 1D depicts a chart view of a continuous analog output of the exemplary extended range position sensor. An exemplary encoding scheme may be implemented and detected as depicted in FIG. 1D. The results of the encoding may be organized in table form as depicted in FIG. 1C. For example, when the magnetic field sensor outputs on signal wires S1, S2 and S3 are above a predetermined threshold 145A, the signal may be defined as an "A" (axial) output. Conversely, when the magnetic field sensor outputs on signal wires S1, S2 and S3 are below a predetermined threshold 145B, the signal may be defined as an "R" (radial) output. Further, when the magnetic field sensor outputs on signal wires S1, S2 and S3 are between the predetermined thresholds the signal may be defined as "0" (null field). In this example, the possible magnetic field sensor outputs define a set of three letters (A, R and 0).

For a given displacement, the magnetic field sensor outputs on signal wires S1, S2 and S3 may determine an encoded word. The number of combinations of n-letter words, given a set of b letters in an alphabet, may be defined as $b^n$. In this example, the number of three-letter words using only letters from three-letter alphabet (A, R and 0) may result in $b^n=3^3$, or 27 possible unique words. Thus, with three magnetic field sensors (FIG. 1B, items 135A, 135B and 135C), the total possible displacement may be the number of possible combinations of words (27 in this example) times the spacing between each sensor. For a given spacing, as magnetic field sensors are added to a reference carrier (e.g., reference carrier 140) the number of possible unique words increases, and therefore the total measurable displacement increases. Accordingly, cascaded sets of permanent magnets may cost-effectively increase the dynamic range of the relative position between the source carrier 125 and the reference carrier 140.

The sensor outputs on signal wires S1, S2 and S3 shown in the table in FIG. 1C are intended to match the magnetic field sensor outputs on signal wires S1, S2 and S3 depicted in FIG. 1B. With reference to FIG. 1B, a ruler 150 measures the longitudinal displacement of the source carrier 125. As the source carrier 125 translates, the individual permanent magnets 130 distributed in the predetermined spatial relationship on the source carrier 125 translate with respect to the magnetic field sensors (FIG. 1B, items 135A, 135B and 135C), and as measured by the ruler 150. As the source carrier 125 translates, the output of the magnetic field sensors on signal wires S1, S2 and S3 may follow the exemplary curves depicted in FIG. 1D. Further, as the source carrier 125 translates, the output of the magnetic field sensors on signal wires S, S2 and S3 may define the table shown in FIG. 1C.

FIG. 1D depicts a chart view of a continuous analog output of the exemplary extended range position sensor. In the depicted example, the output of each of the magnetic field sensors (FIG. 1B, items 135A, 135B and 135C) in the Y-axis is plotted versus displacement in the X-axis. The Y-axis represents percentage of full scale output. In various examples, the magnetic field sensor outputs on signal wires S, S2 and S3 may each include a reference and a signal, where the signal is plotted as shown in the graph in FIG. 1D with respect to the reference. In the depicted example, the magnetic field sensor outputs on signal wires S1. S2 and S3 are positive when the magnetic field sensors (FIG. 1B, items 135A, 135B and 135C) are proximate the axially-oriented permanent magnet (FIG. 1B, item 130A). Further, the magnetic field sensor outputs on signal wires S1, S2 and S3 are negative when the magnetic field sensors (FIG. 1B, items 135A, 135B and 135C) are proximate a radially-oriented permanent magnet (FIG. 1B, item 130C). Finally, the magnetic field sensor outputs on signal wires S1, S2 and S3 are substantially zero (null) when the magnetic field sensors (FIG. 1B, items 135A, 135B and 135C) are proximate the absent permanent magnet (FIG. 1B, item 130B). The term "substantially zero" in this paragraph may be defined as less than about +/−10% of full scale output.

In various examples, the combination of values of the magnetic field sensor outputs on signal wires S1, S2 and S3 may represent a continuum of unique codes for arbitrary displacements along on the X-axis. The magnetic field sensor outputs on signal wires S1, S2 and S3 may be provided to an algorithm that may determine the relative positions of the permanent magnets (FIG. 1B, item 130), may decode the coarse position, and may average position estimates based the orientation of each individual permanent magnet (FIG. 1B, item 130) and/or based on the spacing between permanent magnets (FIG. 1B, item 130). This coarse position encoding combined with the algorithm may provide high-resolution position measurements.

Examples of algorithms that may be suitable for some embodiments are described, for example, in column 4, lines 16-21, of U.S. patent application Ser. No. 10/993,964, titled "Position Detection Apparatus and Method for Linear and Rotary Sensing Applications." filed by Lamar F. Ricks, et. al., on Nov. 18, 2004, the entire disclosure of which is hereby incorporated by reference.

Examples of algorithms that may be suitable for various implementations are described, for example, in column 5, lines 12-18, and column 5, lines 43-47, of U.S. patent application Ser. No. 13/648,844, titled "Extended Smart Position Sensing Range Using Electromagnetics," filed by Joshua Fox, on Oct. 10, 2012, the entire disclosure of which is hereby incorporated by reference.

Figure 2A:
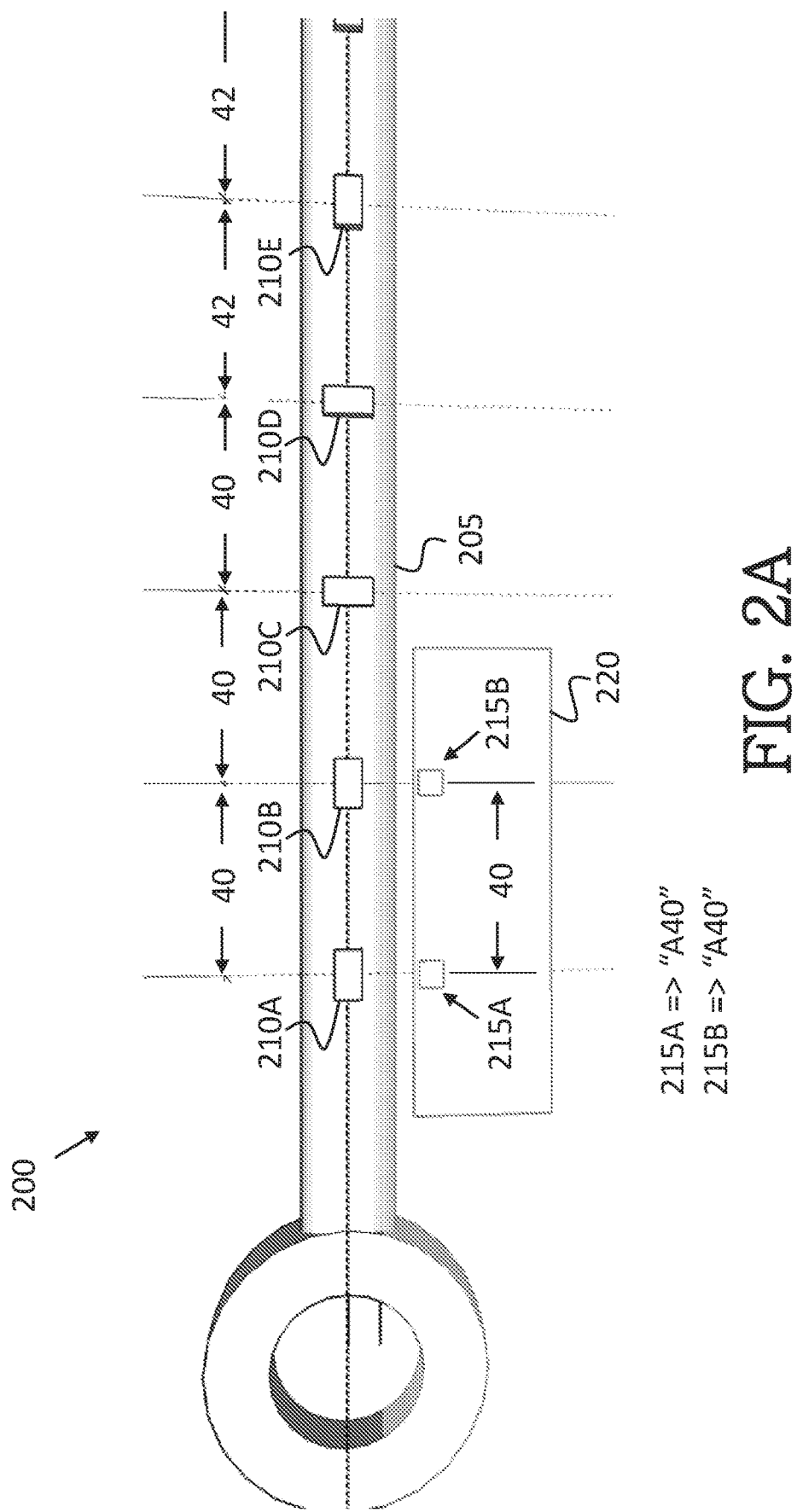
Figure 3:
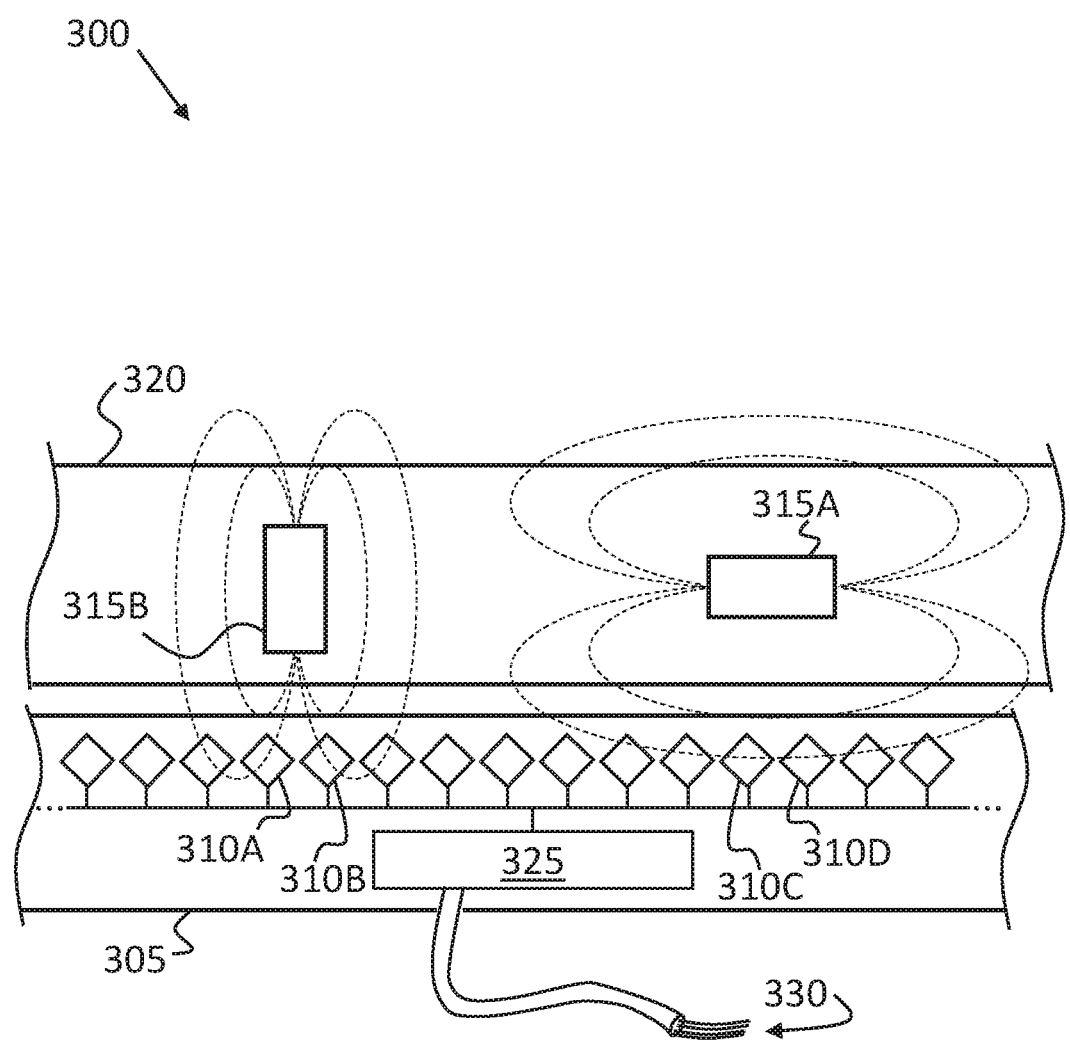
FIG. 3 depicts a detailed view of a reference carrier with closely spaced AMR sensors and a source carrier of an exemplary extended range position sensor.

FIG. 2A depicts a perspective view of a relative peak position between a reference carrier and a source carrier of an exemplary extended range position sensor. An encoder system 200 within an exemplary extended range position sensor includes a source carrier 205. In the depicted example, a set of permanent magnets 210A, 210B, 210C, 210D and 210E are coupled to the source carrier 205. Each of the magnets 210A-210E is arranged in one of two orientations: axial (A) or radial (R).

In an illustrative example, magnets 210A-210E oriented with their longitudinal axis aligned with the source carrier 205 (e.g., magnet 210A) are defined as axial (A). Magnets 210A-210E oriented with their longitudinal axis perpendicular to the source carrier 205 (e.g., magnet 210C) are defined as radial (R). Magnetic fields generated by the magnets 210A-210E are sensed by a set of magnetic field sensors 215A and 215B. The magnetic field sensors 215A and 215B are fixedly coupled to a reference carrier 220.

In the depicted example, the magnetic field sensors 215A and 215B may output a positive signal when the magnetic field sensors 215A and 215B are proximate an axially-oriented permanent magnet (e.g., magnet 210A). Further, the magnetic field sensor outputs on signal wires S1, S2 and S3 may output a negative signal when the magnetic field sensors 215A and 215B are proximate a radially-oriented permanent magnet (e.g., magnet 210C). The polarities (e.g., positive signal, negative signal) make it possible to identify the orientation of a given magnet (e.g., magnets 210A-210E). The polarities also provide a two-letter alphabet for encoding "words" describing sensor positions of the encoder system 200.

Variable spacings between sequential magnets may geometrically increase the number of letters in the encoding alphabet. For example, magnets may be spaced 40 mm, 42 mm or 44 mm apart yielding the "letters": "A40," "A42," "A44," "R40," "R42," and "R44." Within the letter names, A and R represent axial and radial orientations, respectively, and the numbers represent the spacing from the previous magnet, for example. These "letters" may define a six-letter alphabet. In a two-letter (two sensor) encoding system, as in the depicted examples of FIGS. 2A-2F, the six-letter alphabet may define a set of $b^n=6^2$ or 36 possible two-letter words, where b is the number of letters in the alphabet, and n is the number of letters in the encoded words. In this example, assuming an average magnet spacing of 42 mm, the exemplary system may sense a maximum positional displacement range of about (36−1)*42 mm or about 1470 mm. In some examples, the magnets may be arranged in a De Brujin sequence.

In an illustrative example, a three-letter (three sensor) encoding system, the six-letter alphabet may define a set of $b^n=6^3$ or 216 possible three-letter words, where b is the number of letters in the alphabet, and n is the number of letters in the encoded words. In this example, assuming an average magnet spacing of 42 mm, the exemplary system may sense a maximum positional displacement range of about (216−1)*42 mm or about 9030 mm.

Further, positions along the source carrier 205 may include an absent permanent magnet (e.g., FIG. 1B, 130B). The absent permanent magnet may add an additional letter (e.g., letter "0") to the six-letter alphabet, resulting in a seven-letter alphabet. This seven-letter alphabet may define a set of $b^n=7^2$ or 49 possible two-letter words. In this example, assuming an average magnet spacing of 42 mm, the exemplary system may sense positional displacements of about (49−1)*42 mm or 2016 mm.

In the depicted example of FIG. 2A, the magnetic field sensors 215A and 215B are spaced 40 units. The magnets 210A and 210B are also spaced 40 units. As will be discussed in subsequent figures, the source carrier 205 will be translated to the left with respect to the reference carrier 220. With reference to the position of the source carrier 205 in the depicted example of FIG. 2A, the magnetic field sensors 215A and 215B are in direct lateral alignment with the magnets 210A and 210B. Accordingly, the output "letter" of the field sensors 215A and 215B both may be "A40."

Figure 2B:
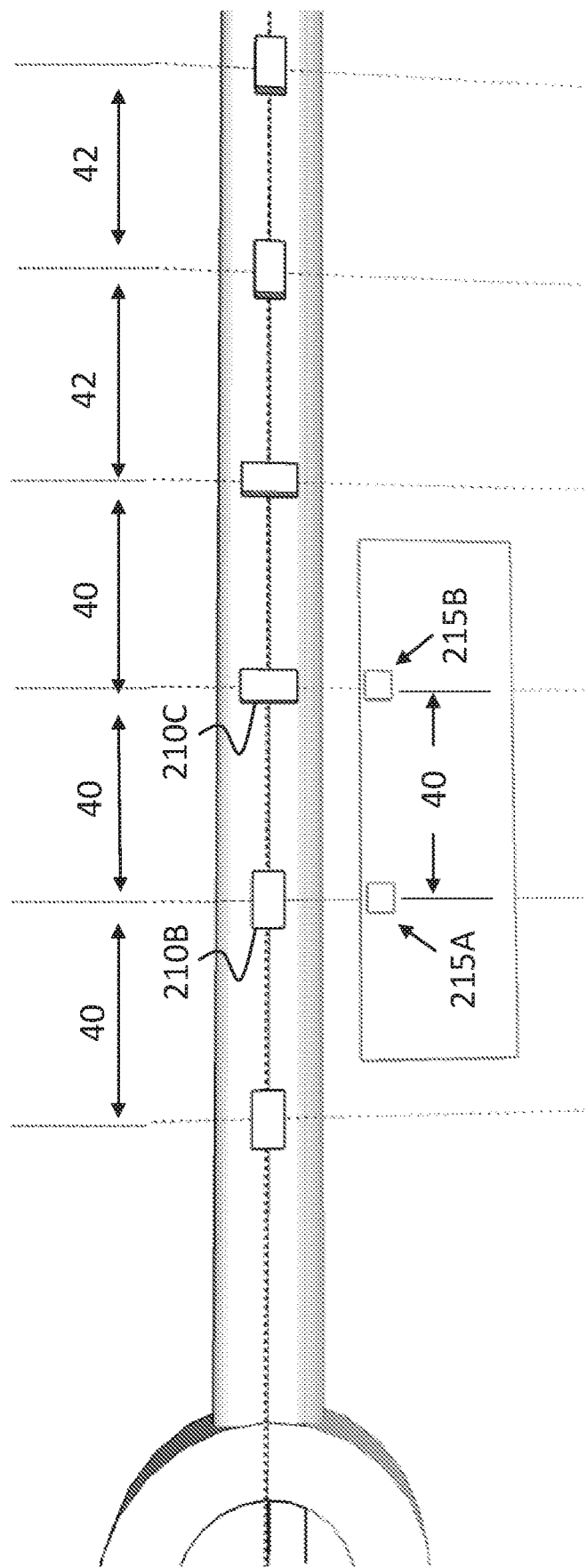

In the depicted example of FIG. 2B, the magnetic field sensors 215A and 215B are spaced 40 units. The magnets 210B and 210C are also spaced 40 units. In the position shown in the depicted example of FIG. 2B, the magnetic field sensors 215A and 215B are in direct lateral alignment with the magnets 210B and 210C. Accordingly, the output of the magnetic field sensor 215A may be "A40" and the output of the magnetic field sensor 215B may be "R40."

Figure 2C:
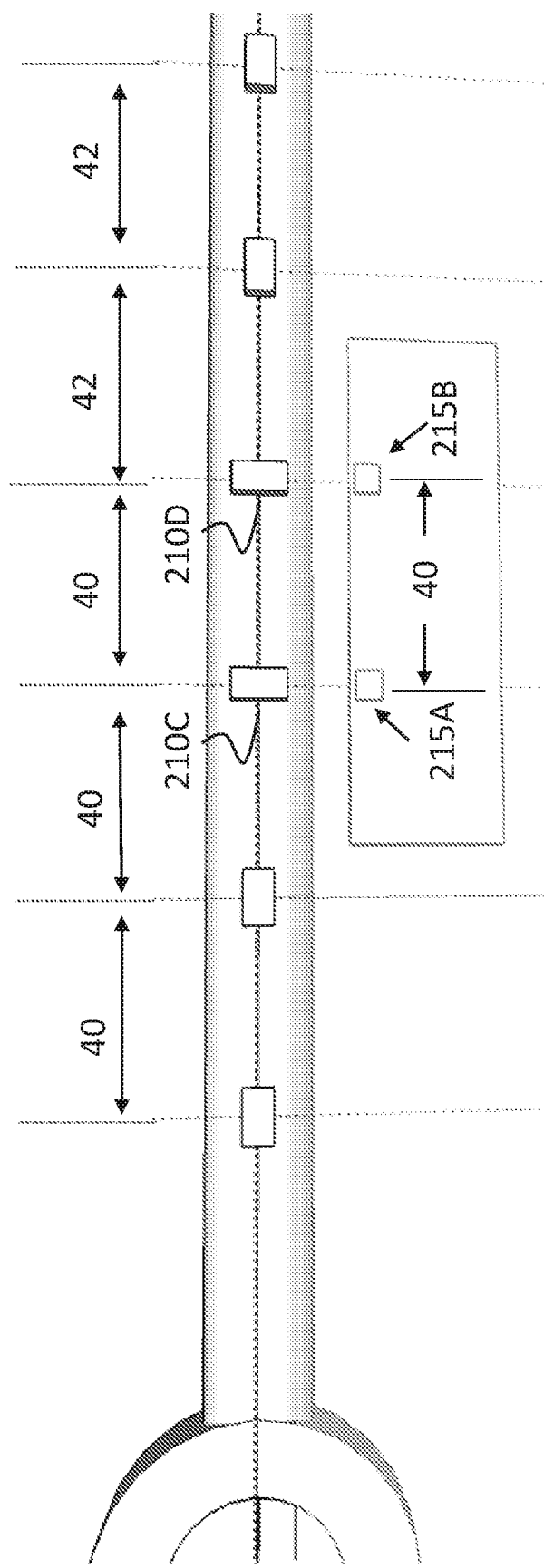

In the depicted example of FIG. 2C, the magnetic field sensors 215A and 215B are spaced 40 units. The magnets 210C and 210D are also spaced 40 units. In the position shown in the depicted example of FIG. 2C, the magnetic field sensors 215A and 215B are in direct lateral alignment with the magnets 210C and 210D. Accordingly, the output of the magnetic field sensor 215A may be "R40" and the output of the magnetic field sensor 215B may be "R40."

Figure 2D:
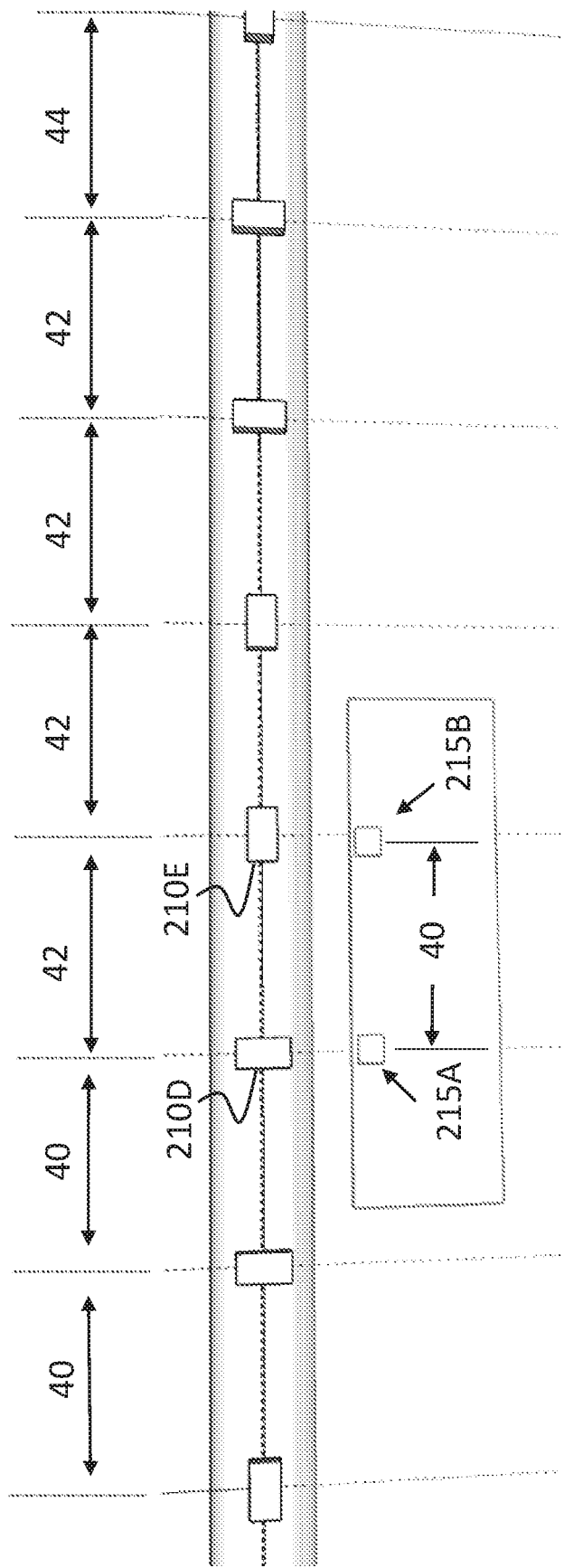

In the depicted example of FIG. 2D, the magnetic field sensors 215A and 215B are spaced 40 units. The magnets 210D and 210E are spaced 42 units. In the position shown in the depicted example of FIG. 2D, the magnetic field sensor 215A is in direct lateral alignment with the magnet 210D, and the magnetic field sensor 215B is offset from magnet 210E by 2 units. Accordingly, the output of the magnetic field sensor 215A may be "R40" and the output of the magnetic field sensor 215B may be "A42."

In the depicted example of FIG. 2E, the magnetic field sensors 215A and 215B are spaced 40 units. The magnets 210E and 210F are spaced 42 units. In the position shown in the depicted example of FIG. 2E, the magnetic field sensor 215A is in direct lateral alignment with the magnet 210E, and the magnetic field sensor 215B is offset from magnet 210F by 2 units. Accordingly, the output of the magnetic field sensor 215A may be "A40" and the output of the magnetic field sensor 215B may be "A42."

Figure 2F:
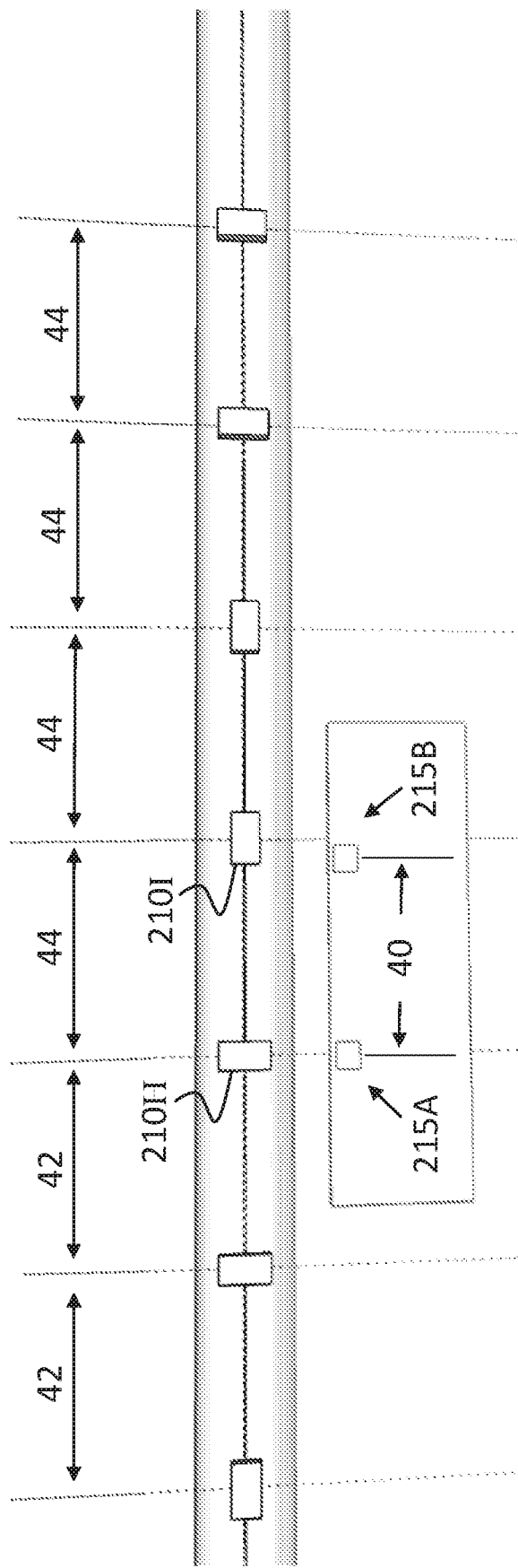

In the depicted example of FIG. 2F, the magnetic field sensors 215A and 215B are spaced 40 units. The magnets 210H and 210I are spaced 44 units. In the position shown in the depicted example of FIG. 2F, the magnetic field sensor 215A is in direct lateral alignment with the magnet 210H, and the magnetic field sensor 215B is offset from magnet 210I by 4 units. Accordingly, the output of the magnetic field sensor 215A may be "R40" and the output of the magnetic field sensor 215B may be "A44."

FIG. 3 depicts a detailed view of a reference carrier with closely spaced AMR sensors and a source carrier of an exemplary extended range position sensor. An encoder system 300 includes a position sensor assembly 305. The position sensor assembly 305 includes magnetic field sensors 310A, 310B, 310C and 310D which make up part of the entire array of magnetic field sensors. The magnetic field sensors in the entire array of field sensors are placed in a serial fashion. The magnetic field sensor 310A senses an incident angle of magnetic flux from an axial magnet 315A. The magnetic field sensor 310B senses an incident angle of a magnetic flux from a radial magnet 315B. The magnets 315A and 315B are fixedly coupled to a source carrier 320. The source carrier 320 is translated from side to side.

In the depicted example, the magnetic flux from the magnet 315B crosses the magnetic field sensor 310A with a positive slope with a magnitude greater than unity, which may equate to a sensor output of +50 mV, for example. The magnetic flux from the magnet 315B crosses the magnetic field sensor 310B with a negative slope with a magnitude greater than unity, which may equate to a sensor output of −50 mV, for example. A controller 325 receives the outputs from the magnetic field sensors 310A and 310B, and may determine a sensor output difference of 100 mV.

In the depicted example, the magnetic flux from the magnet 315A crosses the magnetic field sensor 310C with a negative slope with a magnitude less than unity, which may equate to a sensor output of −10 mV, for example. The magnetic flux from the magnet 315A crosses the magnetic field sensor 310D with a positive slope with a magnitude less than unity, which may equate to a sensor output of +10 mV, for example. The controller 325 receives the outputs from the magnetic field sensors 310C and 310D, and may determine a sensor output difference of 20 mV.

From the depicted examples, the controller 325 may determine the relative position and the placement angle (e.g., radial, axial) of the magnets (e.g., 315A and 315B) on the source carrier 320 from the magnitude and polarity of the sensor outputs. Accordingly, based on the sensor outputs, the controller may encode an output signal on one or more signal wires 330.

For magnetic position sensing, Honeywell manufacturer part number HMC1512, for example, may detect the relative motion of a proximate magnet in linear or angular displacement. Honeywell sensor products are located in Morriston, N.J. Examples of position sensor assemblies (e.g., 305) that may be suitable for some embodiments are described, for example, in FIG. 3, item 300, in U.S. patent application Ser. No. 10/993,964, titled "Position Detection Apparatus and Method for Linear and Rotatory Sensing Applications," filed by Lamar F. Ricks, et. al., on Nov. 18, 2004.

Figure 4:
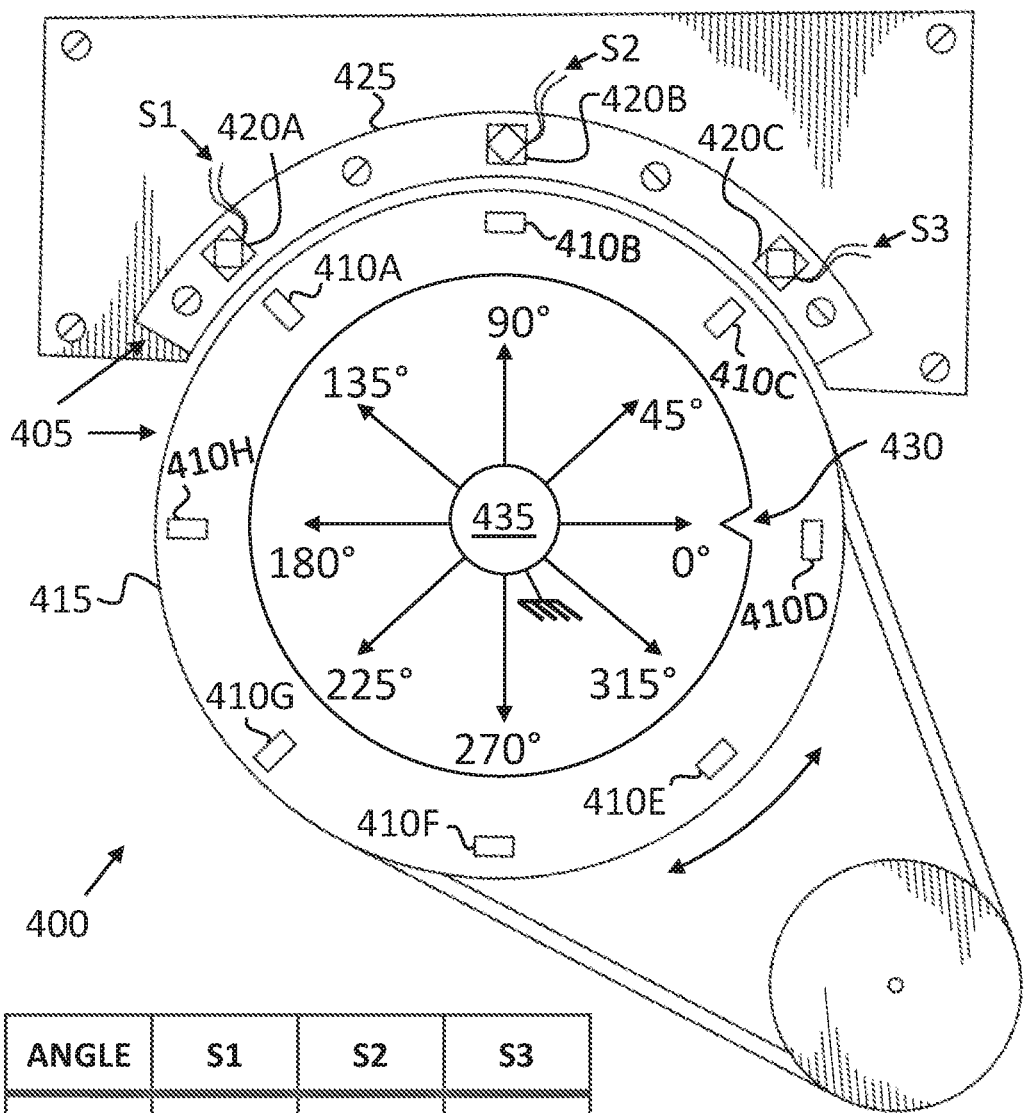
FIG. 4 depicts a plan view of an exemplary extended range angular position sensor.

FIG. 4 depicts a plan view of an exemplary extended range angular position sensor. An exemplary angular position encoder system 400 includes an extended range angular position sensor 405. The angular position sensor 405 includes a set of magnets 410A-410H. The magnets 410A-410H are fixedly coupled to a wheel 415. The magnets 410A, 410C, 410G and 410H are coupled to the wheel 415 in a radial orientation (the longitudinal axis of the magnet substantially aligned with a radial direction of the wheel 415). The magnets 410B, 410D, 410E and 410F are coupled to the wheel 415 in an axial orientation (the longitudinal axis of the magnet substantially perpendicular to a radial direction of the wheel 415). The angular position sensor 405 also includes a set of sensors 420A, 420B and 420C. The set of sensors 420A, 420B and 420C are fixedly coupled to a sensor board 425. The sensor board 425 is curved to complement the curvature of the wheel 415. The sensors 420A-C may determine the orientation of the magnets 410A-410H. The term "substantially" in this paragraph may be defined as differing by no more than about 20 degrees.

The wheel 415 includes a reference indicator 430 (e.g., a reference arrow). The reference arrow 430 points at the angular position of the wheel 415 on a fixed coordinate system 435. The angular position sensor 405 senses the angular position of the wheel 415, outputting a unique code onto the sensor outputs on signal wires S, S2 and S3 as shown in the table in FIG. 4.

In the depicted example, the wheel 415 is at an angular position of zero according to the reference arrow 430 pointing to the 0° marking on the fixed angular coordinate system 435. In this position, the magnets 410A, 410B and 410C magnetically couple to the sensors 420A, 420B and 420C, respectively. The magnets 410A, 410B and 410C are oriented as radial (R), axial (A) and radial (R), respectively. Accordingly, the table in FIG. 4 indicates for an angle of 0°, the sensor outputs on signal wires S1, S2 and S3 of R, A, R, respectively.

When the wheel 415 rotates to the 45° position (reference arrow pointing to the 45° marking on the fixed coordinate system 435), magnets 410B, 410C and 410D magnetically couple to the sensors 420A, 420B and 420C, respectively. The magnets 410B, 410C and 410D are oriented as axial (A), radial (R) and axial (A), respectively. Accordingly, the table of FIG. 4 indicates for the 45° position, sensor outputs on signal wires S1, S2 and S3 of A, R, A respectively. Further, the table in FIG. 4 describes an encoding scheme of the coarse position of the wheel 415. This coarse position encoding combined with the sensor outputs on signal wires S1, S2 and S3 between the coarse positions may be processed by various algorithms to determine high-resolution angular position. In some examples, the magnets 410A-410H may be permanent magnets. The wheel 415 may be a source carrier.

Although various embodiments have been described with reference to the figures, other embodiments are possible. For example, the magnets may be placed on a flexible carrier or a hinged carrier. Magnets placed on a flexible carrier may advantageously measure displacement along arbitrary paths, for example, along a conveyor belt.

In various embodiments, magnets may be placed in various orientations, for example, a radial or axial orientation. These two orientations may generate signals with opposite polarities from a magnetic field sensor. The opposite polarities detected by the outputs of a sensor array may identify the orientation of various magnets. According to this embodiment, a two-letter alphabet may be defined for encoding a coarse position. In various implementations, magnets may be placed in non-orthogonal orientations to produce further differentiation and larger encoding alphabet sets.

In various embodiments, a position sensor including a serial string of two or more individual permanent magnets may be arranged in a fixed spatial relationship with predetermined magnet spacings and predetermined orientations along a predetermined path. The magnets may be fixedly coupled to a source carrier configured to translate each magnet along the predetermined path. The path may be proximate two or more sensors. The sensors may be fixedly coupled with predetermined spacings to a reference carrier. The predetermined magnet spacings and the predetermined orientations may be configured to produce a sensor output. The sensor output may uniquely identify a relative position between the source carrier and the reference carrier.

In an illustrative example, a reference carrier may b$^e$ fixedly coupled to a housing. The reference carrier may be proximate to a source carrier. The source carrier may translate with respect to the reference carrier. The source carrier may include a mechanical coupling, which may be coupled to a structure to be measured for its displacement, for example. In various examples, the coupling may be fixed to a dynamic member of an independent device. Various examples may cost-effectively increase the dynamic range of a position sensor.

In some implementations, signals from various AMR arrays may be provided to a software or firmware algorithm. The algorithm may be executed on various processors, for example, on a Field-programmable Gate-Array (FPGA), on an Application-Specific Integrated Circuit (ASIC) or on various microcontrollers. Algorithmic results may identify the region where the AMR array is located with respect to a magnetic array. The result may be represented as a digital or analog output.

In various embodiments, the processor may be incorporated within a structure containing the magnetic sensor. If the electrical signals from the magnetic sensors are a non-linear indication of the position of the magnetic sensor, then an algorithm may convert the non-linear signals into linear signals indicating a position of the magnetic sensor along a path.

In some embodiments, one or more magnets may be situated along a path, and a magnetic sensor translatable with respect to the magnets. Further, a processor may be coupled to the magnetic sensor. The magnetic sensor may convert a detected magnetic field of a magnet into an electrical signal indicative of a position within a region of the magnetic sensor. The region may be between two magnets situated along the path. The region where the magnetic sensor is situated may be determined by the processor.

Various embodiments may achieve one or more advantages. For example, some embodiments may cost-effectively provide extended range for various position sensors. By incorporation of a fine-resolution algorithm, a higher resolution position between magnets may be determined and may be based on analog aspects of the sensor outputs. Various implementations may be employed underwater, within hazardous environments, and in environments with high vibrations. Some examples may determine various types of displacement, for example, linear displacement, angular displacement, or helical displacement.

Various implementations may not be limited by the length of the electronic sensor. Various embodiments may be implemented without closed-loop control of the magnetic field generators or the magnetic field sensors.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer ar a processor for executing instructions and one or more memories for storing instructions and data. Storage devices suitable for tangibly embodying computer program instructions and data include all forms of non-volatile memory, including, by way of example, semiconductor memory devices, such as EPROM. EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An extended range position sensor comprising:
a source carrier comprising:
a plurality of magnets fixedly coupled to the source carrier, the magnets being cascaded in a first predetermined spatial relationship relative to one another, wherein the first predetermined spatial relationship includes variable spacings between the plurality of magnets, wherein each magnet in the plurality of magnets is arranged in one of at least two distinct predetermined orientations, wherein the at least two distinct predetermined orientations comprise an axial orientation and a radial orientation, wherein a spatially ordered sequence of distinct predetermined orientations of the plurality of magnets maps one-to-one with a De Bruijn sequence; and,
a reference carrier comprising:
a plurality of magnetic field sensors fixedly coupled to the reference carrier, the magnetic field sensors being cascaded in a second predetermined spatial relationship relative to one another,
wherein the plurality of magnets and the plurality of magnetic field sensors are configured to move relative to one another,
wherein the plurality of magnetic field sensors are configured to generate a plurality of output signals, the plurality of output signals being a function of: (1) relative positions between the plurality of magnets and the plurality of magnetic field sensors, and (2) the predetermined orientations of the plurality of magnets,
wherein the plurality of output signals are configured to be encoded as one of a finite number of codes, wherein each code in the finite number of codes corresponds to a specific relative position between the plurality of magnets and the plurality of magnetic field sensors.

2. The extended range position sensor of claim 1, wherein each code in the finite number of codes corresponds to a unique relative position between the plurality of magnets and the plurality of magnetic field sensors.

3. The extended range position sensor of claim 1, wherein the plurality of magnetic field sensors comprise anisotropic magneto-resistive elements.

4. The extended range position sensor of claim 1:
wherein the source carrier extends longitudinally, and the plurality of magnets are longitudinally spaced along the source carrier,
wherein the reference carrier extends longitudinally, and the plurality of magnetic field sensors are longitudinally spaced along the reference carrier,
wherein the source carrier and the reference carrier are disposed laterally adjacent and parallel to, one another, and,
wherein the reference carrier and the source carrier are configured to translate longitudinally relative to one another.

5. The extended range position sensor of claim 1:
wherein the source carrier exhibits rotational symmetry, and the plurality of magnets are spaced at different radial angles along the source carrier,
wherein the reference carrier and the source carrier are configured to rotationally translate relative to one another.

6. The extended range position sensor of claim 1, wherein when an output signal in the plurality of output signals is above a first threshold, the output signal is encoded as a first code, and when the output signal is below a second threshold, the output signal is encoded as a second code distinct from the first code.

7. The extended range position sensor of claim 1, wherein each magnet in the plurality of magnets is equidistantly spaced from consecutively spaced magnets in the plurality of magnets.

8. The extended range position sensor of claim 1, further comprising an encoder configured to encode the plurality of output signals as one of a finite number of codes.

9. The extended range position sensor of claim 1, further comprising a controller configured to determine an encoded code corresponding to a specific relative position between the plurality of magnets and the plurality of magnetic field sensors.

10. The extended range position sensor of claim 1, wherein the axial orientation is parallel to a longitudinal axis of the source carrier and the radial orientation is perpendicular to the longitudinal axis of the source carrier.

11. An extended range position sensor comprising:
a source carrier comprising:
a plurality of magnets fixedly coupled to the source carrier, the magnets being cascaded in a first predetermined spatial relationship relative to one another, wherein the first predetermined spatial relationship includes variable spacings between the plurality of magnets, wherein each magnet in the plurality of magnets is arranged in one of at least two distinct predetermined orientations, wherein the at least two distinct predetermined orientations comprise an axial orientation and a radial orientation; and,
a reference carrier comprising:
a plurality of magnetic field sensors fixedly coupled to the reference carrier, the magnetic field sensors being cascaded in a second predetermined spatial relationship relative to one another,
wherein the plurality of magnets and the plurality of magnetic field sensors are configured to move relative to one another,
wherein the plurality of magnetic field sensors are configured to generate a plurality of output signals, the plurality of output signals being a function of: (1) relative positions between the plurality of magnets and the plurality of magnetic field sensors, and (2) the predetermined orientations of the plurality of magnets,
wherein the plurality of output signals are configured to be encoded as one of a finite number of codes, wherein each code in the finite number of codes corresponds to a specific relative position between the plurality of magnets and the plurality of magnetic field sensors.

12. The extended range position sensor of claim 11, wherein each code in the finite number of codes corresponds to a unique relative position between the plurality of magnets and the plurality of magnetic field sensors.

13. The extended range position sensor of claim 11:
wherein the source carrier extends longitudinally, and the plurality of magnets are longitudinally spaced along the source carrier,
wherein the reference carrier extends longitudinally, and the plurality of magnetic field sensors are longitudinally spaced along the reference carrier,
wherein the source carrier and the reference carrier are disposed laterally adjacent and parallel to, one another, and,
wherein the reference carrier and the source carrier are configured to translate longitudinally relative to one another.

14. The extended range position sensor of claim 11:
wherein the source carrier exhibits rotational symmetry, and the plurality of magnets are spaced at different radial angles along the source carrier,
wherein the reference carrier and the source carrier are configured to rotationally translate relative to one another.

15. The extended range position sensor of claim 11, wherein each magnet in the plurality of magnets is equidistantly spaced from consecutively spaced magnets in the plurality of magnets.

16. The extended range position sensor of claim 11, wherein the axial orientation is parallel to a longitudinal axis of the source carrier and the radial orientation is perpendicular to the longitudinal axis of the source carrier.

17. An extended range position sensor comprising:
a source carrier comprising:
a plurality of magnets fixedly coupled to the source carrier, the magnets being cascaded in a first predetermined spatial relationship relative to one another, wherein the first predetermined spatial relationship includes variable spacings between the plurality of magnets, wherein each magnet in the plurality of magnets is arranged in one of at least two distinct predetermined orientations, wherein the at least two distinct predetermined orientations comprise an axial orientation and a radial orientation;
a reference carrier comprising:
a plurality of magnetic field sensors fixedly coupled to the reference carrier, the magnetic field sensors being cascaded in a second predetermined spatial relationship relative to one another; and,
a controller configured to determine an encoded code corresponding to a specific relative position between the plurality of magnets and the plurality of magnetic field sensors,
wherein the plurality of magnets and the plurality of magnetic field sensors are configured to move relative to one another,
wherein the plurality of magnetic field sensors are configured to generate a plurality of output signals, the plurality of output signals being a function of: (1) relative positions between the plurality of magnets and the plurality of magnetic field sensors, and (2) the predetermined orientations of the plurality of magnets,
wherein the plurality of output signals are configured to be encoded as one of a finite number of codes, wherein each code in the finite number of codes corresponds to a specific relative position between the plurality of magnets and the plurality of magnetic field sensors.

18. The extended range position sensor of claim 17:
wherein the source carrier extends longitudinally, and the plurality of magnets are longitudinally spaced along the source carrier,
wherein the reference carrier extends longitudinally, and the plurality of magnetic field sensors are longitudinally spaced along the reference carrier,
wherein the source carrier and the reference carrier are disposed laterally adjacent and parallel to, one another, and,
wherein the reference carrier and the source carrier are configured to translate longitudinally relative to one another.

19. The extended range position sensor of claim 17:
wherein the source carrier exhibits rotational symmetry, and the plurality of magnets are spaced at different radial angles along the source carrier,
wherein the reference carrier and the source carrier are configured to rotationally translate relative to one another.

20. The extended range position sensor of claim 17, wherein the axial orientation is parallel to a longitudinal axis of the source carrier and the radial orientation is perpendicular to the longitudinal axis of the source carrier.

* * * * *